United States Patent
Croft et al.

(10) Patent No.: US 6,279,616 B1
(45) Date of Patent: Aug. 28, 2001

(54) RUBBER COMPOSITIONS, HOSE MANUFACTURED THEREFROM, AND METHOD OF MANUFACTURING HOSE

(76) Inventors: Thomas C. Croft, 2308 Couch La., Columbia, TN (US) 38401; Kevin T. Perkins, 219 Lakeview Dr., Hohenwald, TN (US) 38462

( * ) Notice: Subject to any disclaimer, the term of this patent is extended or adjusted under 35 U.S.C. 154(b) by 0 days.

(21) Appl. No.: 09/375,008

(22) Filed: Aug. 16, 1999

(51) Int. Cl.⁷ .................. F16L 11/08; B32B 15/08; B32B 1/08; B29D 23/00
(52) U.S. Cl. .................. 138/143; 138/133; 428/35.7; 428/462
(58) Field of Search .................. 428/35.7, 462; 138/143, 133

(56) References Cited

U.S. PATENT DOCUMENTS

| | | |
|---|---|---|
| 4,269,555 | 5/1981 | Harrison . |
| 4,366,746 | 1/1983 | Rosecrans . |
| 4,508,867 | 4/1985 | Sato . |
| 4,762,589 * | 8/1988 | Akiyama et al. . |
| 4,992,314 | 2/1991 | Saitoh . |
| 5,068,137 | 11/1991 | Ozawa et al. . |
| 5,077,108 | 12/1991 | Ozawa et al. . |
| 5,084,314 | 1/1992 | Igarashi . |
| 5,264,262 | 11/1993 | Igarashi . |
| 5,296,555 | 3/1994 | Ozawa . |
| 5,526,848 | 6/1996 | Terashima et al. . |

* cited by examiner

*Primary Examiner*—Tae H. Yoon
(74) *Attorney, Agent, or Firm*—Millen, White, Zelano & Branigan, P.C.

(57) ABSTRACT

A rubber composition includes acrylonitrile butadiene, polychloroprene and polyoctanamer. The rubber composition is particularly useful in making the tubular portion of reinforced rubber base which has brass-coated metal braiding therearound. By using this rubber composition, the process of manufacturing reinforced rubber hose is enhanced because the compound is easily mixed, the need of process aids is minimized, and the freezing temperature necessary to crystallize the rubber is reduced.

15 Claims, 1 Drawing Sheet

RUBBER COMPOSITIONS, HOSE MANUFACTURED THEREFROM, AND METHOD OF MANUFACTURING HOSE

FIELD OF THE INVENTION

The present invention relates to rubber compositions, hoses fabricated using the rubber compositions, and methods of fabricating hoses using the rubber compositions. More particularly, the present invention relates to rubber compositions usable for various purposes, reinforced hoses made of the rubber compositions, and to methods of manufacturing reinforced hoses using the rubber compositions.

BACKGROUND OF THE INVENTION

A variety of rubber products such as hoses, belts rubber rolls and molded goods are widely used for many purposes. With rubber goods, there is continuing need to improve performance by, for example, improving low temperature flexibility, maintaining physical properties when the goods are exposed to heat, and improving oil resistance and ozone resistance. These considerations are of special importance with hydraulic fluid transfer hoses. In that such hoses are used for a multitude of applications, they are produced in great quantities. Accordingly, there is a need to decrease the cost of the rubber compound component of such hoses, as well as to improve the processibility of the rubber compound in both mixing and hose manufacturing steps. As always, it is also desirable to decrease the amount of scrap generated by the manufacturing process.

While accomplishing these ends, it is an important consideration to improve adhesion to metal substrates, such as brass coated wire substrates, which are used for reinforcement. Such an improvement can occur by omitting adhesion promoters from the compound formulation so as to avoid problems in both processing and in the finished product. In addition, there are problems introduced by using processing aids such as waxes and oils which normally interfere with adhesion between the rubber and metal. By minimizing the use of process aids, adhesion between the rubber and metal. By minimizing the use of process aids, adhesion problems can be reduced and the cost of manufacture decreases. In producing hose which has braided wire reinforcement, it is necessary to expose the rubber tubular portion to freezing temperatures. By lowering the freezing temperature, refrigeration costs are reduced. Moreover, with reinforced hose, the tubular portion of the hose which is manufactured from a rubber composition must stiffen prior to braiding. Accordingly, if the tube stiffens more quickly, there is improved dimensional stability during storage prior to braiding so that braiding can be performed more quickly after the rubber tubing has been produced. This lowers inventory and storage costs.

In view of the aforementioned considerations, there is a need for improvements in rubber compounds, which lead to improved hose performance at lower costs. While these considerations are of specific importance relative to hydraulic fluid hose, they are also of considerable importance with respect to other rubber and rubber based products.

SUMMARY OF THE INVENTION

In view of these features and other features, the present invention is directed to novel compositions for a rubber compound comprising the first component selected from the group consisting of the acrylonitrile butadiene, chlorinated polyethylene, chlorosulfanated polyethylene, and polychloroprene. A second component is selected from a group not duplicating the first component, and consisting of polychloroprene, acrylonitrile butadiene, and chlorosulfonated polyethylene. A third component is selected from the group consisting of polyoctanamer, isoprene, polybutadiene, and styrene butadiens. The composition has more of the first component than the second component or the third component.

In a more specific and preferable aspect of the invention, the first component is acrylonitrile butadiene, the second component is polychloroprene, and the third component is polyoctanamer.

In another aspect of the invention, a hose structure is provided which includes a metal substrate, preferably made of brass coated metal wire, to which the aforedescribed novel rubber compositions are bonded.

In still a further aspect of the invention, the reinforced hose is made according to a method in which a tube is formed of the novel rubber compositions and the brass coated wire is then braided upon the tube.

DETAILED DESCRIPTION

Figure 1:
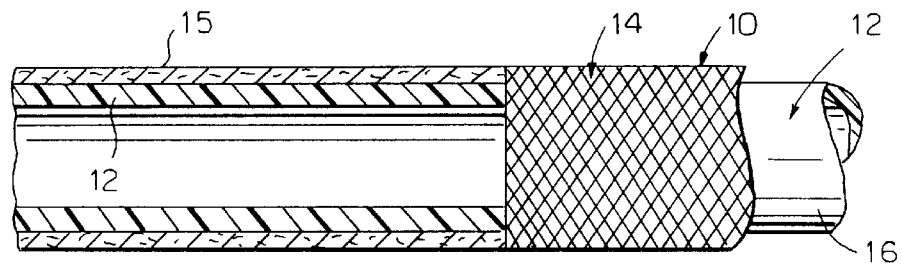
FIG. 1 illustrates a section of reinforced rubber hose, shown partially in elevation and partially broken away, configured in accordance with the principles of the present invention.

Referring now to FIG. 1, there is shown a reinforced hose 10 configured in accordance with the principles of the present invention. The reinforced hose 10 has a specific use as a hose for transferring pressurized hydraulic fluid and includes a tubular rubber portion 12 surrounded by a braided metal wire reinforcing layer 14. The braided metal wire layer 14 is preferably made of brass coated steel wire 15 to which the outer cylindrical surface 16 of the tubular portion 12 adheres.

Figure 2:
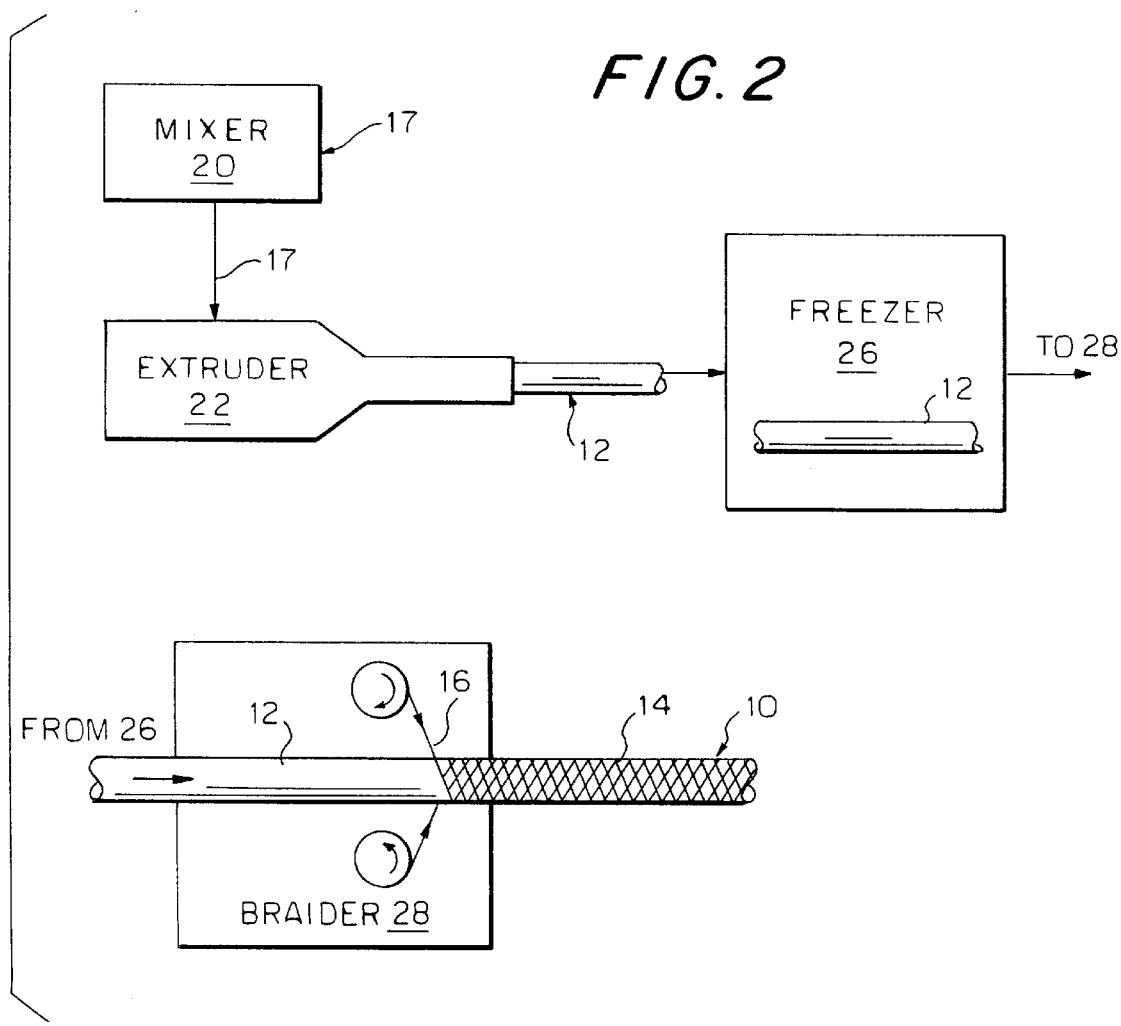
FIG. 2 is a schematic diagram illustrating the manufacture of the reinforced rubber hose of FIG. 1, according to the methods of the present invention.

Referring now to FIG. 2, the hose 10 is manufactured by an arrangement in which a rubber compound 17 with reinforcing carbon black (or clay or silica) as well as additives are mixed in a mixer 20 which is connected to an extruder 22. The extruder 22 produces the tubular portion 12 of the reinforced hose 10. After it emerges from the extruder 22, the tubular portion 12 is retained in a freezer 26 to crystallize the rubber of which the tubular portion 12 is comprised and is thereafter passed through a braider 28 which braids the brass coated wire 15 around the tubular portion to form the reinforcing layer 14.

It is desirable with reinforced hose, such as the reinforced hose 10, to improve low temperature flexibility of the hose, to retain the physical properties of the hose when the hose is exposed to heat and to have good oil resistance and good ozone resistance. It is also desirable to decrease both the cost of the rubber compound 17 used to make the tubular portion 10 and the cost of the overall product. These cost reductions result from improving the processibility of the rubber in both the mixing step for the rubber constituents and during the manufacturing step in which the rubber compound 17 is extruded as a tube 12 and reinforced with the brass coated braiding 14. Decreases in costs also occur by reducing the scrap product rate which also reduces environmental impact of these products since a high scrap rate is indicative of inefficiencies increases production amounts of chemicals as well as the amount of product which must be disposed of before it is used. By utilizing the rubber compounds of the present invention, all of these concerns are addressed.

In accordance with the preferred embodiments of the present invention, the material forming the rubber compound 17 which is placed in the mixer 20 includes a combination of acrylonitrile butadiene, polychloroprene and polyoctanamer. This preferable mixture results in a rubber which has improved low temperature flexibility, retention of physical properties with heat exposure, and good oil resistance as well as good ozone resistance.

By utilizing the mixture of acrylonitrile butadiene, polychloroprene and polyoctanamer to provide the rubber compound of the tube 12, there is improved adhesion to the brass coated wire substrate 14 which improved adhesion allows for the omission of adhesion promoters from the compound formula. Omitting adhesion promoters is beneficial because adhesion promoters cause their own problems both in processing rubber compositions to make the finished product and in the performance of the finished product. Moreover, the preferred rubber formulation allows for the omission of process aids such as waxes, oils, and the like, which normally interfere with the adhesion of the rubber surface 16 to the brass coated wire braid 14.

It has also been found that the preferred formulation does not require a freezing temperature as low as that currently used during the braiding process in order to achieve necessary dimensional stability. Accordingly, there is faster production and lower refrigeration costs which result in a lower product cost. Moreover, there is an improvement in the extrusion process because the preferred formulation crystallizes more rapidly and thus stiffens more quickly upon exiting the extruder 22, which gives improved dimensional stability during storage prior to braiding.

By using acrylonitrile butadiene, polychloroprene and polyoctanamer to formulate the rubber compound, process aids that are normally used in rubber compounds are not necessary. The polyoctanamer is a preferred softener and is exemplary of materials which add thermoplastic properties to the compound. In addition, polyoctanamer provides all of the advantages of the processing aids. Acrylonitrile butadiene and polychloroprene are both high viscosity compounds which are softened by the addition of polyoctanamer, which significantly improves the ease at which the compounds can be mixed. In addition, polyoctanamer also works to improve low temperature flexibility. Moreover, polyoctanamer adds significantly to the uncured hardness of the compound, which decreases the amount of scrap at both the extruder 22 and the braider 28.

The use of acrylonitrile butadiene provides resistance to oil and other non-polar fluids which are transferred in the hose 10 while the acrylonitrile component provides good low temperature flexibility with adequate heat resistance. Preferably, the acrylonitrile butadiene used in a preferred formulation has medium acrylonitrile content, for example, 28% with a 55 Mooney viscosity. Moreover, acrylonitrile butadiene serves to lower material cost over compounds prepared using only polychloroprene.

By using polychloroprene, two significant properties are provided for the formulation. First, the crystallization rate of polychloroprene is such that when the uncured compound is subjected to the freezing action in the freezer 26 prior to applying the wire braid 14 to the tube surface 16, the tubular portion 12 stiffens faster than if the rubber compound were comprised of acrylonitrile butadiene alone. The second benefit of including polychloroprene is improvement in adhesion between the tube surface 16 and the surface of the wire 15. The brass coated wire substrate 14 utilized in the hydraulic hose 10 provides an opportunity for the formation of cuprous sulfide which bonds with the points of unsaturation in the rubber, which points are readily available from polychloroprene. Moreover, the added adhesion enhances significantly the performance of the hose 10 in both field and laboratory settings.

The mixture includes a composition for the rubber compound wherein the first component is about 70 to about 90 parts per hundred rubber hydrocarbon by weight (phr), the second component is about 15 to about 20 phr, and the third component is about 2 to about 10 phr. In the preferred embodiment, the acrylonitrile butadiene is about 77.0 phr, the polychloroprene is about 18 phr, and the polyoctanamer is about 5 phr. These three components comprise the rubber composition. To this rubber composition is added a hydrocarbon resin, phthalate plasticizer and reinforcing carbon black. The amount of reinforcing carbon black is in the range of about 50 to about 150 phr by weight, which carbon black is mixed with the rubber compounds. To this mixture is added a metal oxide such as zinc oxide, sulfur in the form of elemental sulfur, and anti-oxidant such as octylated diphenylamine, a retarder such as phthalic anhydride, and a fatty acid such as stearic acid. A vulcanizing aid such as 2-(4-Morpholinothio)-benzothiazole is also added to the mixture.

The resulting rubber material has durometer hardness in a range of about 75 to about 95 pts shore A, a tensile strength in the range of about 1500 psi to about 2400 psi, and a percent elongation in the range of about 100 to 300 percent. Preferably, the rubber has a durometer hardness of about 85 pts shore A, tensile strength of about 1900 psi, and an elongation of about 150 percent.

EXAMPLES

The following is a preferable list of components of the composition in parts per hundred rubber hydrocarbon by weight (phr):

| Ingredient | phr (parts per hundred rubber hydrocarbon by weight) | Description |
| --- | --- | --- |
| Krynac 28E55 | 77.0 | Acrylonitrile butadiene |
| Baypren 210 | 18.0 | Polychloroprene |
| Vestenamer 8012 | 5.0 | Polyoctanamer |
| LX 2600 Resin | 3.0 | Hydrocarbon resin |
| Palatinol 711-P | 14.0 | Phthalate plasticizer |
| N650 and/or N762 | 110.0 | Reinforcing carbon black |
| Antioxidant S | 0.90 | Octylated diphenylamine |
| Retarder AK | 0.50 | Phthalic anhydride |
| Stearic acid | 0.90 | fatty acid |
| Vulkacit and/or MOZ | 1.30 | 2-(4-Morpholinothio)-benzothiazole |
| Zinc oxide | 4.25 | metal oxide |
| Sulfur | 2.30 | elemental sulfur |

Method parameters

The aforementioned components are placed in mixer, such as a Shaw K5 mixer or a similar internal type of mixer and mixed for about 3 to about 10 minutes, preferably about 5 minutes, at a drop temperature in the range of about 300° F., and preferably about 330° F.

After being extruded, the tubular portion 12 is exposed to freezing in the freezer 26 at a temperature in the range of about 0° F., with a preferred temperature of about −120° F.

Alternative Ingredients for the Preferred Formulation:

| Preferred Formula Components | Alternatives |
|---|---|
| Acrylonitrile butadiene | Chlorinated polyethylene, Chlorosulfonated polyethylene, Polychloroprene - about 70 to about 90 phr |
| Polychloroprene | acrylonitrile butadiene, chlorosulfonated polyethylene - about 15 to about 25 phr |
| Polyoctanamer | Isoprene, Polybutadiene, Styrene butadiene - about 2 to about 10 phr |
| Hydrocarbon resin | Mineral rubber, High styrene resin |
| Phthalate plasticizer | Ester or polyester plasticizers |
| Carbon black | Clay, Silica - about 50 to about 150 phr |
| Octylated diphenylamine | Diryl p-phenylenediamine, Diphenyl-p-phenylenediamine |
| Phthalic anhydride | Salicyclic acid, Nitroso diphenylamine |
| Stearicacid | Oleic acid, Linoleic acid |
| 2-(4-Morpholinothio)-benzothiazole | N-isopropyl-2-benzothiazyl-sulfenamide |
| Zinc oxide | Magnesium oxide, Calcium oxide |
| Elemental sulfur | Sulfur donors |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A hose structure comprising:
   a rubber composition formed into a rubber tube, the rubber composition comprising:
   a first component selected from a group consisting of acrylonitrile butadiene, rubber chlorinated polyethylene, chlorosulfonated polyethylene and polychloroprene;
   a second component selected from the group consisting of polychloroprene, acrylonitrile butadiene rubber and chlorosulfonated polyethylene, the second component not duplicating the first component, and
   a third component selected from the group consisting of polyoctanamer, polyisoprene, polybutadiene and styrene butadiene rubber,
   wherein the first component is about 70 to about 90 phr, the second component is about 15 to about 25 phr, and the third component is about 2 to about 10 phr, and metal reinforcement formed around and bonded to the rubber tube;
   the components having been mixed and heated to a temperature in the range of about 140° F. to about 150° F. before being extruded and then having been exposed to freezing at a temperature in the range of about 0° F. before having the metal reinforcement formed therearound.

2. The hose structure of claim 1, wherein the metal reinforcement is brass-coated metal wire.

3. The hose structure of claim 1, wherein the first component is acrylonitrile butadiene rubber, the second component is polychloroprene and the third component is polyoctanamer.

4. The hose structure of claim 1, wherein the acrylonitrile butadiene rubber comprises about 77 phr, the polychloroprene comprises about 18 phr and the polyoctanamer comprises about 5 phr.

5. The hose structure of claim 1, wherein the rubber composition has a durometer hardness of about 85 pts shore A, a tensile strength of about 1900 psi and an elongation of about 150 percent.

6. A hose structure comprising:
   a rubber composition formed into a rubber tube, the rubber composition consisting essentially of 100 phr of a base rubber comprising about 70 to about 85 phr acrylonitrile butadiene rubber, about 15 to about 20 parts polychloroprene and about 2 to 10 phr polyoctanamer, and
   metal reinforcement formed around and bonded to the rubber tube;
   the components having been mixed and heated to a temperature in the range of about 140° F.

7. The hose structure of claim 6, wherein the composition comprises: about 77 phr of acrylonitrile butadiene rubber, about 18 phr of polychloroprene and about 5 phr of polyoctanamer.

8. The hose structure of claim 6, wherein the rubber composition has a durometer in the range of about 75 to about 95 pts shore A, a tensile strength in the range of about 1500 psi to about 2400 psi, and a percent elongation in the range of about 100 to 300 percent.

9. The hose structure of claim 7, wherein the rubber composition has a durometer hardness of about 85 pts shore A, a tensile strength of about 1900 psi and an elongation of about 150 percent.

10. The hose structure of claim 8, wherein the rubber composition has about 50 to about 150 phr of carbon black mixed therewith.

11. The hose structure of claim 5, wherein the rubber composition has a durometer hardness of about 85 pts shore A, a tensile strength of about 1900 psi and an elongation of about 150 percent.

12. A process for making reinforced hose comprising:
   mixing a composition comprised acrylonitrite butadiene rubber, polychloroprene and polyoctanamer to provide a rubber compound at a temperature in the range of about 300° F. to about 360° F. for about 3 to about 20 minutes;
   extruding the composition as a tube at a rate of about 20 to about 80 feet per minute while at a temperature in the range of about 140° F. to about 200° F.;
   freezing the rubber tube at a temperature of about 0° F. to about –150° F. to crystallize the rubber,
   and braiding wire reinforcement around the rubber tube after the tube has been crystallized by freezing.

13. The process of claim 12, wherein the wire reinforcement is brass-plated steel wire.

14. The hose structure of claim 6 wherein the metal reinforcement is metal wire braided around the rubber tube.

15. The hose structure of claim 14 wherein the metal wire is brass coated steel.

* * * * *